(12) United States Patent
Tanizawa et al.

(10) Patent No.: US 12,233,696 B2
(45) Date of Patent: Feb. 25, 2025

(54) POWER LINE ROUTING STRUCTURE IN HYBRID VEHICLE

(71) Applicant: MITSUBISHI JIDOSHA KOGYO KABUSHIKI KAISHA, Tokyo (JP)

(72) Inventors: Shoji Tanizawa, Tokyo (JP); Yusuke Okada, Tokyo (JP); Masaharu Yamagishi, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 264 days.

(21) Appl. No.: 17/761,405

(22) PCT Filed: Nov. 9, 2020

(86) PCT No.: PCT/JP2020/041652
§ 371 (c)(1),
(2) Date: Mar. 17, 2022

(87) PCT Pub. No.: WO2021/166337
PCT Pub. Date: Aug. 26, 2021

(65) Prior Publication Data
US 2022/0371420 A1 Nov. 24, 2022

(30) Foreign Application Priority Data
Feb. 19, 2020 (JP) ................. 2020-026519

(51) Int. Cl.
*B60K 1/04* (2019.01)
*B60K 6/40* (2007.10)
(Continued)

(52) U.S. Cl.
CPC .............. *B60K 1/04* (2013.01); *B60K 6/40* (2013.01); *B60K 11/04* (2013.01); *H02G 3/30* (2013.01); *B60K 2001/0405* (2013.01)

(58) Field of Classification Search
CPC . B60K 1/04; B60K 6/40; B60K 11/04; B60K 2001/0405
See application file for complete search history.

(56) References Cited

U.S. PATENT DOCUMENTS

2006/0289224 A1 12/2006 Ono et al.
2014/0151086 A1* 6/2014 Yamanaka ............... B60K 6/40
174/138 R
(Continued)

FOREIGN PATENT DOCUMENTS

CN 107082050 A * 8/2017 ............. B60K 1/02
CN 110091714 A 8/2019
(Continued)

OTHER PUBLICATIONS

International Search Report (PCT/ISA/210) issued in PCT/JP2020/041652, dated Jan. 19, 2021.
(Continued)

*Primary Examiner* — Bickey Dhakal
(74) *Attorney, Agent, or Firm* — Birch, Stewart, Kolasch & Birch, LLP (57) ABSTRACT

On a lower side of a floor (2), a battery storage section (31) is formed on a front side of a cross member (27) that connects left and right side members (3*l*, 3*r*) to dispose a driving battery (34), a tank storage section (30) is formed on a rear side to dispose a fuel tank (32) and a driving motor (9) is disposed on a rear side of the tank storage section (30). A power cable (26) from a terminal block (34*a*) of the driving battery (34) is routed and fixed as appropriate so as to bypass the fuel tank (32) via the left side of the fuel tank (32) in the tank storage section (30) and connected to the driving motor (9) via a junction box (21). In an extra length routing area
(Continued)

(37) on a side wall (27a) of the cross member (27), an extra length area (26a) is formed by slackening the power cable (26) in a semicircular shape.

9 Claims, 5 Drawing Sheets

(51) Int. Cl.
*B60K 11/04* (2006.01)
*H02G 3/30* (2006.01)

(56) References Cited

U.S. PATENT DOCUMENTS

| | | | |
|---|---|---|---|
| 2017/0232913 A1* | 8/2017 | Fukazu | ............ B60L 50/60 307/10.1 |
| 2017/0237379 A1* | 8/2017 | Fukazu | ............ H02G 3/30 318/503 |
| 2019/0232776 A1 | 8/2019 | Matsuda | |
| 2020/0047808 A1 | 2/2020 | Ajisaka | |

FOREIGN PATENT DOCUMENTS

| | | |
|---|---|---|
| JP | 2007-039020 A | 2/2007 |
| JP | 2007-135302 A | 5/2007 |
| JP | 2012-040893 A | 3/2012 |
| JP | 2016-052862 A | 4/2016 |
| JP | 2018-070076 A | 5/2018 |
| JP | 2019-151174 A | 9/2019 |
| WO | WO 2011/135270 A1 | 11/2011 |
| WO | WO 2021/166337 A1 | 8/2021 |

OTHER PUBLICATIONS

Written Opinion (PCT/ISA/237) issued in PCT/JP2020/041652, dated Jan. 19, 2021.
Extended European Search Report for European Application No. 20920257.1, dated Sep. 4, 2023.
Indonesian Office Action for Indonesian Application No. P00202203524, dated Dec. 12, 2023, with English translation.
International Preliminary Report on Patentability and English translation of the Written Opinion of the International Searching Authority for International Application No. PCT/JP2020/041652, dated Aug. 23, 2022.
Chinese Office Action for corresponding Chinese Application 202080065889.5 issued Jan. 8, 2025 with an English Translation.

* cited by examiner

POWER LINE ROUTING STRUCTURE IN HYBRID VEHICLE

TECHNICAL FIELD

The present invention relates to a power line routing structure in a hybrid vehicle.

BACKGROUND ART

As a hybrid vehicle, for example, Patent Document 1 discloses a vehicle equipped with a driving motor and an engine at the front of a vehicle body, and an IPU (electrical equipment for electric motors) made up of a driving battery, an inverter or the like in an IPU storage section formed under the floor at the rear of the vehicle body.

The driving motor and the IPU are connected via three-phase power lines under the floor. However, since a tank storage section is formed in the center under the floor where a fuel tank for the engine is disposed, the power lines are routed so as to avoid the fuel tank. More specifically, the power line from the driving motor is extended backward in the center of a vehicle width direction, pulled into the tank storage section and fixed with a bracket or the like as appropriate while being extended along an inside wall of the tank storage section so as to bypass the fuel tank. Furthermore, the power line is pulled out from the tank storage section, extended backward in the center of the vehicle width direction again and connected to the IPU.

PRIOR ART DOCUMENT

Patent Document

Patent Document 1: Japanese Patent Application Laid-Open No. 2012-40893

SUMMARY OF THE INVENTION

Problems to be Solved by the Invention

The technology described in Patent Document 1 is a routing structure of power lines that connect the inverter included in the IPU and the driving motor, but aside from this, there are also hybrid vehicles adopting a routing structure of power lines that connect a driving battery and an inverter integrated with a driving motor.

In such hybrid vehicles, for example, a battery storage section is formed on a front side of cross members connecting left and right side members under the floor of the vehicle body to dispose the driving battery, a tank storage section is formed on a rear side of the cross members to dispose the fuel tank, and further a junction box is disposed on a rear side of the fuel tank to relay power from the driving battery to be supplied to the inverter. As a result, since the fuel tank is located between the driving battery and the junction box, a power line connecting a terminal block of the driving battery and a terminal block of the junction box needs to be routed so as to avoid the fuel tank as in the case of the technology in Patent Document 1.

Thus, the power line from the terminal block provided on the rear side of the driving battery is pulled into the tank storage section, extended, for example, leftward along a side wall of the cross members in the tank storage section, further extended backward along the side wall of the side member on the left side, and fixed with a bracket or the like as appropriate. In this way, the power line is routed in the tank storage section so as to bypass the fuel tank, and moreover, the power line is pulled out of the tank storage section and connected to the terminal block of the junction box.

However, with such a power line routing structure, there has been room for improvement in terms of power line protection in the event of a side collision by another vehicle.

For example, when the power line is fixed to the left side member as described above, if another vehicle collides from the left at a front or back position that matches the driving battery, the terminal block is also displaced to the right together with the driving battery, which has been crushed by impact. By contrast, since the power lines are fixed to the side walls of the cross members and the side members and their position displacements are regulated, large tension is generated in the power line along with position displacement of the terminal block, causing damage such as wire breakage. Even if the bracket or the like is damaged and a restraint to the power line is released, the fuel tank that escapes from impact and is hardly displaced may interfere with the behavior of the power line following the terminal block, and so damage to the power line due to excessive tension is inevitable after all.

An object of the present invention, which has been made to solve such problems, is to provide a power line routing structure in a hybrid vehicle capable of reliably protecting power lines in the event of a side collision by another vehicle with respect to the power line routing structure in which a driving battery and a driving motor are connected via power lines routed so as to bypass a fuel tank in a tank storage section.

Means for Solving the Problems

In order to achieve the above object, an aspect of the present invention is directed to a power line routing structure in a hybrid vehicle including a fuel tank disposed in a tank storage section formed between left and right side members on a lower side of a floor of a vehicle body, a driving battery disposed in a battery storage section aligned with the tank storage section in a front-rear direction across a cross member connecting between the left and right side members, a driving motor disposed on an opposite side of the battery storage section in the front-rear direction of the vehicle with respect to the tank storage section and a power line that supplies power from the driving battery to the driving motor, in which part of the tank storage section includes the left and right side members and the cross members, the power line is extended along a side wall of either one of the left and right side members from a side wall of the cross member so as to bypass the fuel tank via either one of the left and right sides of the fuel tank from a terminal block of the driving battery and an extra length area with slack being formed in an area of the power line along the side wall of the cross member (claim 1).

According to the power line routing structure in a hybrid vehicle configured as described above, for example, when another vehicle collides from either one of the left and right sides (on the side on which the power line bypasses the fuel tank) at the position in a front-rear direction that corresponds to the driving battery, the driving battery is crushed in the left and right directions by the impact, and the terminal block is thereby displaced to the other of the left and right sides. With position displacement, the extra length area of the power line is stretched, and the increase in tension generated in the power line is suppressed.

As another aspect, the power line is preferably extended in a mountainous way protruding upward along the side wall of the cross member to provide slack in the extra length area (claim 2).

According to the power line routing structure in a hybrid vehicle configured as described above, the power line is extended in a mountainous way, and so an extra length area with slack being formed.

As a further aspect, the terminal block of the driving battery is preferably disposed on a lower side of the cross member (claim 3).

According to the power line routing structure in a hybrid vehicle configured as described above, since the terminal block is disposed under the cross member, the power line is directly guided from the terminal block to the side wall of the cross member.

As a still further aspect, a battery-side connector on the driving battery side to which a power-line-side connector on the power line side is connected is preferably formed on the fuel tank side on the terminal block of the driving battery, and while the power-line-side connector is connected to the battery-side connector, the power-line-side connector preferably protrudes from the cross member to the fuel tank side and the power line is preferably extended upward from a position at which the power-line-side connector protrudes toward the fuel tank side (claim 4).

According to the power line routing structure in a hybrid vehicle configured as described above, the power line is pulled out upward from the terminal block and routed upward on the side wall of the cross member without significantly changing the extension direction.

As a still further aspect, the power line routing structure further includes a cooling pipe that circulates cooling water in the driving motor to cool the driving motor, in which the cooling pipe is preferably pulled into the tank storage section from the driving motor, extended along the side wall of the cross member so as to bypass the fuel tank via the other of the left and right sides of the fuel tank, and further extended passing through a point of intersection with the power line at a point of the side wall of the cross member, and at the point of intersection, the cooling pipe is preferably disposed on the cross member side and the power line is disposed on the fuel tank side (claim 5).

According to the power line routing structure in a hybrid vehicle configured as described above, the behavior of the power line following position displacement of the terminal block of the driving battery is possible without being blocked by the cooling pipe in the event of a side collision of another vehicle.

As a still further aspect, at the point of intersection, a first protector member is preferably fitted to the cooling pipe and a second protector member is preferably fitted to the power line (claim 6).

According to the power line routing structure in a hybrid vehicle configured as described above, since heat of the cooling pipe is blocked by the first and second protector members, heat damage to the battery-side power cable is prevented.

As a still further aspect, the second protector member is preferably extended from the point of intersection to an area along either one of the left and right side members (claim 7).

According to the power line routing structure in a hybrid vehicle configured as described above, in the event of a side collision by another vehicle from either one of the left and right sides, the power line may be sandwiched between the side member deformed by impact and the fuel tank, but the power line is protected by the second protector member.

As a still further aspect, in the area along either one of the left and right side members, the second protector member is preferably fixed to the floor panel of the vehicle body with a bolt, and in the extra length area, the power line is preferably fixed to the side wall of the cross member with a clip that comes off due to a predetermined load (claim 8).

According to the power line routing structure in a hybrid vehicle configured as described above, periodic shaking of the extra length area due to vibration during vehicle running may cause deterioration of the battery-side power cable, but such a case is prevented by fixing with the clip.

As a still further aspect, a third protector member with flexibility is preferably fitted to the power line in the extra length area (claim 9).

According to the power line routing structure in a hybrid vehicle configured as described above, since the third protector member fitted to the power line is flexible, the behavior of the power line following position displacement of the terminal block of the driving battery is possible.

Advantageous Effects of the Invention

According to the power line routing structure in a hybrid vehicle of the present invention, the power line routing structure in which the driving battery and the driving motor are connected via the power line routed so as to bypass the fuel tank in the tank storage section can reliably protect the power line in the event of a side collision by another vehicle.

MODE FOR CARRYING OUT THE INVENTION

Hereinafter, an embodiment of a power line routing structure in a hybrid vehicle that embodies the present invention will be described.

Figure 1:
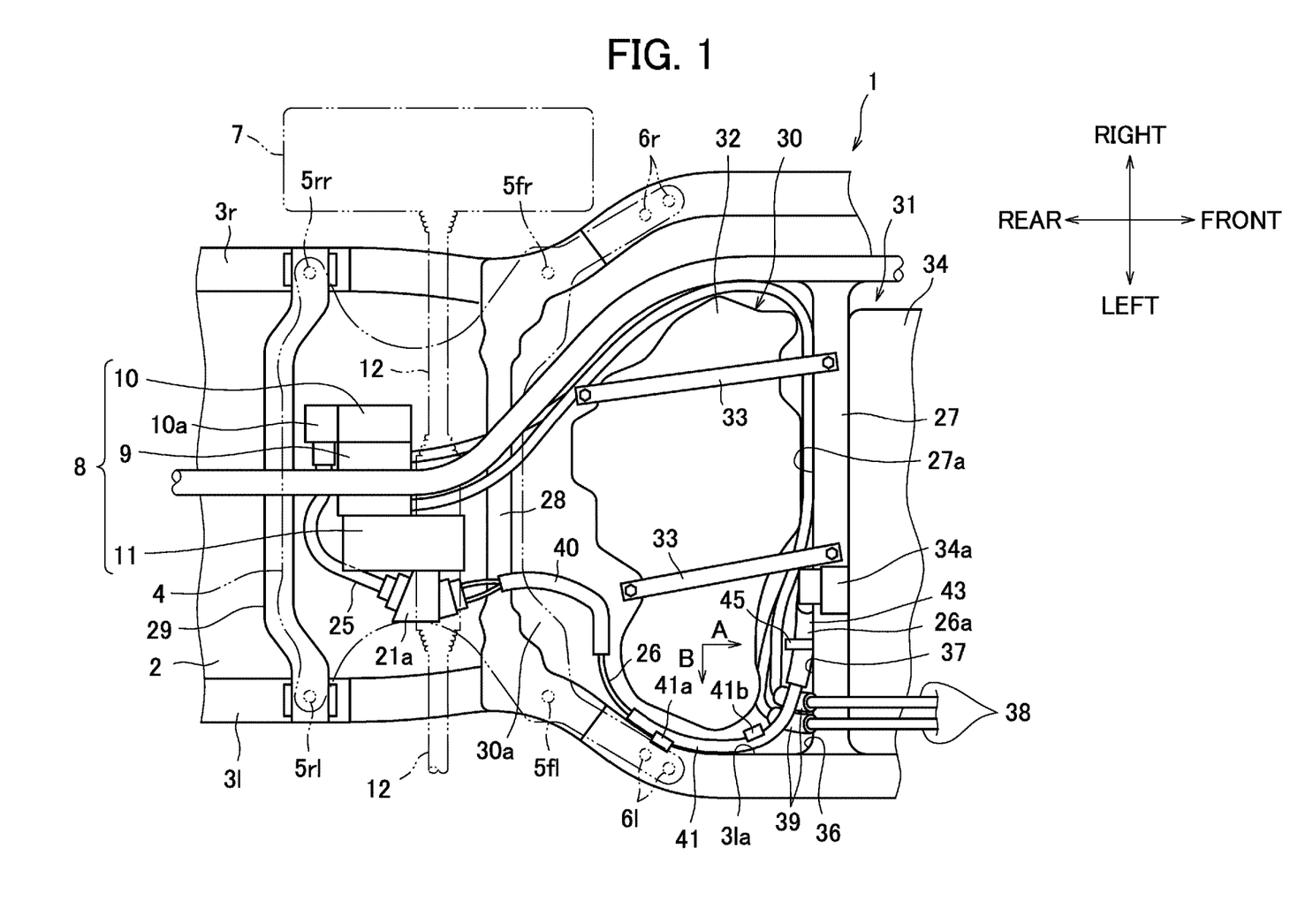
FIG. 1 is a bottom view illustrating a rear part of a hybrid vehicle of an embodiment.
Figure 2:
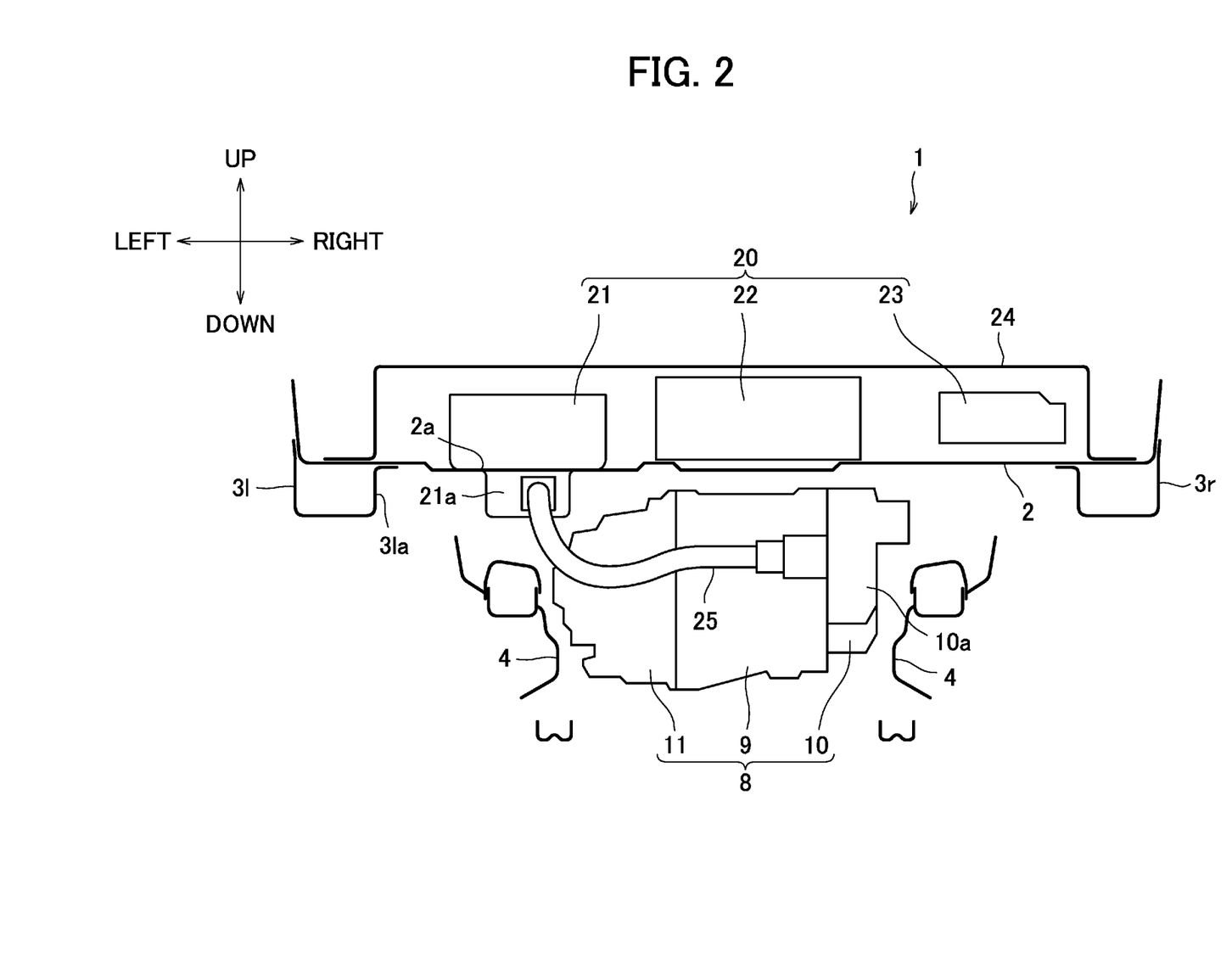
FIG. 2 is a cross-sectional view illustrating a positional relationship between a drive unit and a power supply unit with respect to a floor when the rear part of the hybrid vehicle is viewed from the rear.

FIG. 1 is a bottom view illustrating a rear part of a hybrid vehicle of the embodiment and FIG. 2 is a cross-sectional view illustrating a positional relationship between a drive unit and a power supply unit with respect to a floor when the rear part of the hybrid vehicle is likewise viewed from the rear. In the following description, front-rear, left-right and up-down directions will be expressed with the driver in the vehicle as a main subject.

As shown in FIGS. 1 and 2, a pair of left and right side members 3l and 3r are provided on an undersurface of a floor 2 that constitutes a vehicle body of a hybrid vehicle 1 and each side member 3*l* or 3*r* forms a closed cross section with the floor 2, and is extended in a front-rear direction.

As shown by two-dot dashed lines in FIG. 1, rear suspension cross members 4 are disposed on an underside of the floor 2 and both the left and right sides thereof are suspended and supported from the respective side members 3*l* and 3*r*. More specifically, fixed points 5*fl*, 5*fr*, 5*rl* and 5*rr* are provided as support mounts at front positions and rear positions of the left and right side members 3*l* and 3*r*, and front left and right, and rear left and right parts of the rear suspension cross member 4 are suspended and supported from the respective fixed points 5*fl*, 5*fr*, 5*rl* and 5*rr*. Both left and right sides of the rear suspension cross member 4 are extended forward from the fixed points 5*fl* and 5*fr* at the front positions and fastened to the left and right side members 3*l* and 3*r* by a pair of bolts 6*l* and 6*r* respectively.

Left and right rear wheels 7 (only the right side is shown in FIG. 1) are supported to the left side and the right side of the rear suspension cross member 4 via double-wishbone based suspension (not shown). Since the configuration of the suspension is well known, detailed description will be omitted, but the suspension is constructed of an upper arm, a lower arm, a toe control link, a spring and an absorber or the like. A driving motor 9, an inverter 10 provided integrally with the driving motor 9 and a transaxle 11 that functions as a reduction gear, as a drive unit 8, are attached to the rear suspension cross member 4 under the floor 2 via a support mount (not shown) and the left and right rear wheels 7 are connected to the transaxle 11 via a pair of left and right drive shafts 12.

The driving motor 9 is driven and controlled by the inverter 10. For example, during power drive control, DC power from a driving battery 34, which will be described later, is converted to three-phase AC power by the inverter 10, supplied to the driving motor 9, and with rotation of the driving motor 9 reduced in the transaxle 11, the left and right rear wheels 7 are driven via the drive shafts 12. On the other hand, during regenerative control, the rotation of the left and right rear wheels 7 is transmitted to the driving motor 9 via the drive shafts 12 and the transaxle 11, three-phase AC power generated by the driving motor 9 is converted to DC power by the inverter 10 and charged to the driving battery 34.

As shown in FIG. 2, a junction box 21, a charger 22 and a DC-AC inverter 23 are installed as a power supply unit 20 on the floor 2 in order from the left side. As is generally known, the junction box 21 is an apparatus that connects the driving battery 34 and various electric loads such as the driving motor 9, the charger 22 is an apparatus that charges power from an external power supply at a charging station or the like to the driving battery 34, and the DC-AC inverter 23 is an apparatus that converts DC power of the driving battery 34 to AC power of 100 V for allowing home appliances to be used. Note that the power supply unit 20 is covered with a cover 24 from above and a third row seat (not shown) is located directly above the power supply unit 20.

Although not shown, the junction box 21 is connected to the charger 22 and the DC-AC inverter 23 via a power cable. As shown in FIGS. 1 and 2, a terminal block 21*a* is provided on an undersurface of the junction box 21, fitted into a through hole 2*a* formed in the floor 2 and protrudes downward. One end of a motor side power cable 25 is connected to a rear surface of the terminal block 21*a* and the other end is connected to a left side surface of a terminal block 10*a* of the inverter 10.

Although details will be described later, a front part of the terminal block 21*a* of the junction box 21 is connected to the driving battery 34 via a battery-side power cable 26 (power line). Power is exchanged between the driving battery 34 and the charger 22 and between the DC-AC inverter 23 and the inverter 10 of the driving motor 9 by relaying the junction box 21. For example, DC power from the driving battery 34 is supplied to the DC-AC inverter 23 via the junction box 21, converted to AC power of 100 V and used to operate home appliances. At a charging station or the like, AC power supplied from an external power supply is converted to DC power by the charger 22 and charged to the driving battery 34 via the junction box 21. The above-described power drive control or regenerative control of the driving motor 9 is also performed via the junction box 21.

Figure 3:
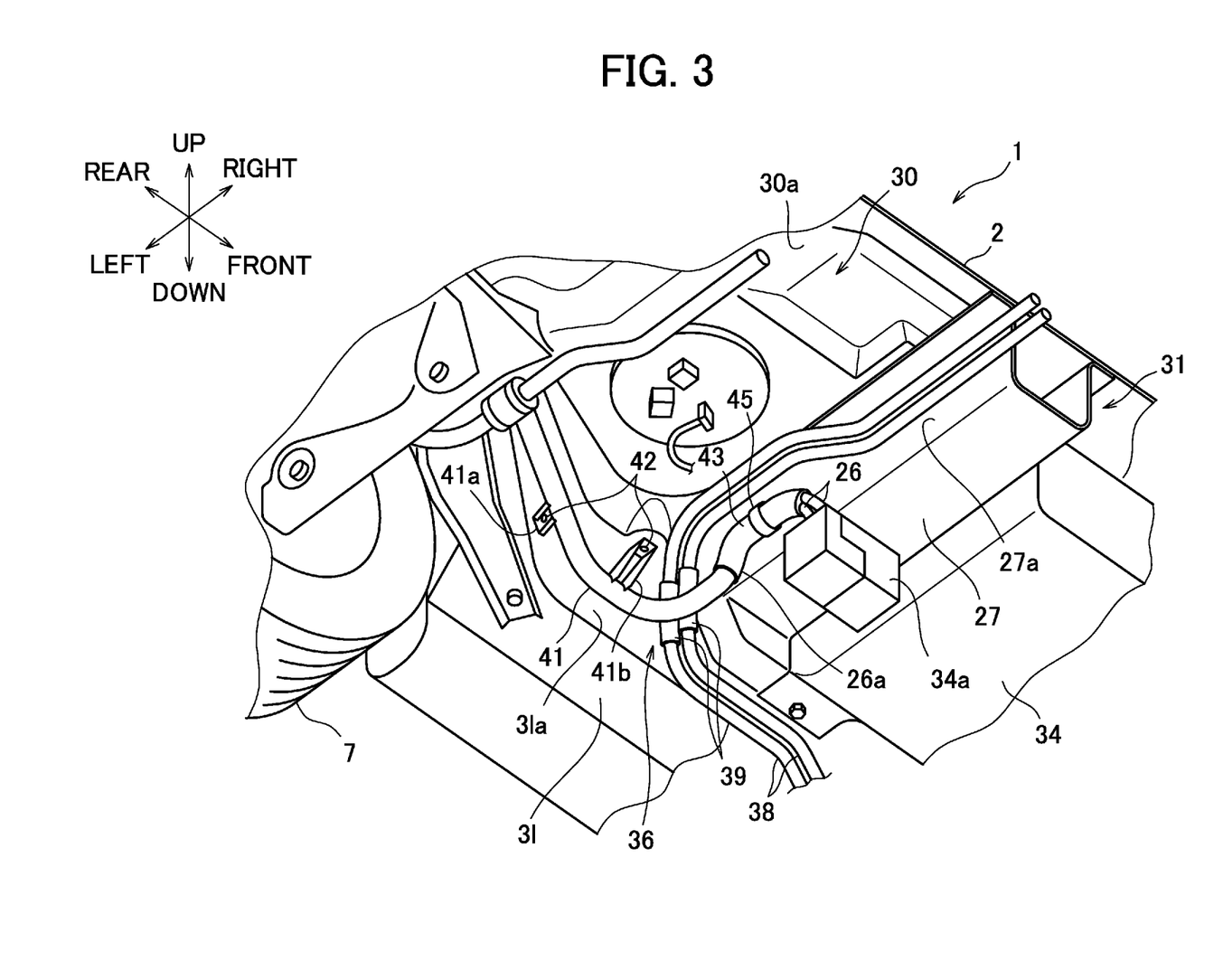
FIG. 3 is a perspective view illustrating a power line routing state in a tank storage section when a rear bottom surface of the vehicle body of the hybrid vehicle is viewed diagonally from the rear.

FIG. 3 is a perspective view illustrating a power line routing state in the tank storage section when the rear bottom surface of the vehicle body of the hybrid vehicle 1 is viewed diagonally from the rear.

As shown in FIGS. 1 and 3, front, middle and rear floor cross members 27 to 29 are provided between the left and right side members 3*l* and 3*r* under the floor 2, each cross member 27 to 29 is extended in a left-right direction while forming a closed cross section with the undersurface of the floor 2, both ends of which are connected to the left and right side members 3*l* and 3*r*. The respective fixed points 5*fl*, 5*fr*, 5*rl* and 5*rr* that suspend and support the above-described rear suspension cross member 4 are provided at positions of both ends of the middle and rear floor cross members 28 and 29.

The front floor cross member 27 is disposed in front of the middle floor cross member 28, a tank storage section 30 opening downward is formed between the front and middle floor cross members 27 and 28 under the floor 2 and a battery storage section 31 opening downward is formed in front of the front floor cross member 27. As a result, the tank storage section 30 and the battery storage section 31 are juxtaposed in the front-rear direction. A fuel tank 32 is disposed in the tank storage section 30, fixed with a pair of brackets 33 and contains fuel to be supplied to the engine (not shown) mounted on the front of the vehicle body. The driving battery 34 is disposed in the battery storage section 31 and the circumference of the driving battery 34 is fixed with bolts (not shown).

Figure 4:
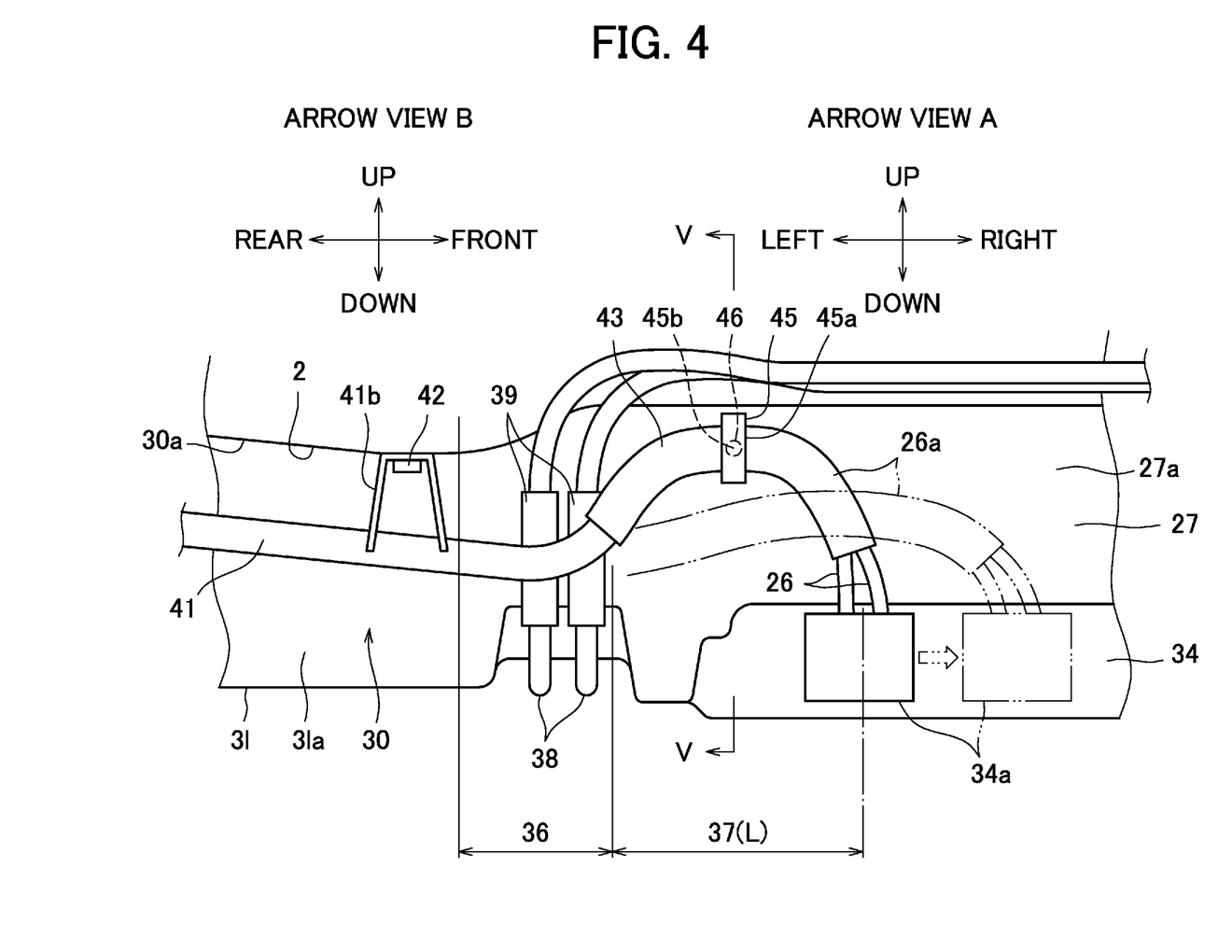
FIG. 4 is a schematic view showing, on the same plane, an arrow view A of FIG. 1 when the side wall of the front floor cross member is viewed from the rear and an arrow view B when the side wall of the left side member is viewed from the right.

FIG. 4 is a schematic view showing, on the same plane, an arrow view A of FIG. 1 when the side wall of the front floor cross member 27 is viewed from the rear and an arrow view B when the side wall of the left side member 3*l* is viewed from the right.

As shown in FIGS. 1 and 4, in the tank storage section 30, a side wall 27*a* of the front floor cross member 27 and a side wall 3*la* of the left side member 3*l* are connected via a curved corner 36. A terminal block 34*a* is provided on the rear side of the driving battery 34, the terminal block 34*a* is located below the front floor cross member 27, a distal end of the terminal block 34*a* protrudes slightly rearward (fuel tank side) from the side wall 27*a* of the front floor cross member 27 facing into the tank storage section 30. Although not shown, the terminal built in the terminal block 34*a* is extended rearward from the driving battery 34 and has an L-shape bent upward. Thus, a connector opening upward (battery-side connector on the driving battery side) is formed at a protruding point at the distal end of the terminal block 34*a*, allowing a connector (not shown) provided at one end of the battery-side power cable 26 (power-line-side connector on the power line side) to be connected from above.

Thus, the terminal block 34*a* is located below the front floor cross member 27 and the connector of the terminal block 34*a* opens upward. For this reason, the connector of the battery-side power cable 26 connected to the connector of the terminal block 34*a* protrudes to the fuel tank 32 side, the battery-side power cable 26 is pulled out upward from this protruding point, directly guided by the side wall 27*a* of the front floor cross member 27, and further routed upward on the side wall 27*a* without significantly changing the extending direction. Although details will be described later, such an upward pull-out state of the cable is intended for routing of the battery-side power cable 26 with slack.

Note that the connector structure is not limited to the aforementioned one as long as it can realize this pull-out state. For example, a connector opening rearward is formed behind the terminal block 34*a* using an I-shaped terminal instead of the L-shaped terminal and a connector opening orthogonal to the cable longitudinal direction is provided at an end of the battery-side power cable 26. The connector is connected to the connector of the terminal block 34*a* from behind in a posture with the battery-side power cable 26 extended upward. The battery-side power cable 26 is pulled out upward from the terminal block 34*a* also in this case.

Similarly, for routing the battery-side power cable 26 with slack, the terminal block 34*a* is separated rightward from the corner 36 by a distance L shown in FIG. 4, and the battery-side power cable 26 is routed with slack, as will be described hereinafter using an area on the side wall 27*a* of the front floor cross member 27 corresponding to this distance L. In the following description, the point of the battery-side power cable 26 with slack is called an "extra length area 26*a*" and an area on the side wall 27*a* corresponding to the distance L whereby the extra length area 26*a* is routed is called an "extra length routing area 37."

Since the routing of the battery-side power cable 26 is associated with a cooling pipe 38 routed likewise in the tank storage section 30, a routing state of the cooling pipe 38 will be described first. The cooling pipe 38 is provided as a pair of pipe lines to circulate cooling water between the driving motor 9 and a heat sink (not shown) disposed on the front of the vehicle body and cooling action of the driving motor 9 is exerted by circulating the cooling water.

As shown in FIGS. 1, 3 and 4, one end of each cooling pipe 38 is connected to the driving motor 9, extended forward, pulled into the tank storage section 30, extended forward so as to bypass the fuel tank 32 via the right side of the fuel tank 32 (the other of the left and right sides), and further extended leftward along the side wall 27*a* of the front floor cross member 27. In the corner 36 between the side wall 27*a* of the front floor cross member 27 and the side wall 3*la* of the left side member 3*l*, each cooling pipe 38 is bent downward, and pulled out from the tank storage section 30. A pipe-shaped heat insulating material 39 made of synthetic resin material with thermal insulation and elasticity (first protector member) is fitted to each cooling pipe 38. Furthermore, each cooling pipe 38 is bent forward, extended forward beyond the undersurface of the front floor cross member 27 and connected to the heat sink (not shown).

In order to avoid heat damage from the cooling pipe 38 in which hot cooling water circulates, the battery-side power cable 26 is routed on the opposite side of the cooling pipe 38 in the tank storage section 30. That is, one end of the battery-side power cable 26 is connected to the front side of the terminal block 21*a* of the junction box 21, the battery-side power cable 26 is pulled into the tank storage section 30 and extended forward along the side wall 3*la* of the left side member 3*l* so as to bypass the fuel tank 32 via the left side of the fuel tank 32 (either one of the left and right sides).

A pipe-shaped first covering material 40 made of synthetic resin material with high strength is fitted at a point where the battery-side power cable 26 is pulled into the tank storage section 30, and a bracket (not shown) formed integrally with the first covering material 40 is fixed to a bottom wall 30*a* or the like of the tank storage section 30 with bolts. Similarly, a pipe-shaped second covering material 41 made of synthetic resin material with high strength (second protector member) is fitted at a point along the side wall 3*la* of the side member 3*l* of the battery-side power cable 26 and a pair of brackets 41*a* and 41*b* formed integrally with the second covering material 41 are fixed to a bottom wall 30*a* of the tank storage section 30 and a side wall 3*la* of the side member 3*l* with bolts 42, respectively.

With the fitting of the first and second covering materials 40 and 41, the battery-side power cable 26 is kept to a predetermined shape following the bottom wall 30*a* of the tank storage section 30 and the side wall 3*la* of the side member 3*l*, and position displacement due to vibration or the like during vehicle running is prevented. In the event of a side collision from the left by another vehicle, the battery-side power cable 26 may be sandwiched between the side member 3*l* and the fuel tank 32 deformed to the right by impact, but the strong first and second covering materials 40 and 41 protect the battery-side power cable 26, preventing damage such as wire breakage.

Note that characteristics of the first and second covering materials 40 and 41 are not limited to the above-described characteristics, but as in the case of a third covering material 43, which will be described later, urethane material or the like may be used to provide high impact absorption to protect the battery-side power cable 26.

The second covering material 41 extends forward along the side wall 3*la* of the side member 3*l*, is bent rightward in the corner 36 reaching the side wall 27*a* of the front floor cross member 27. Since the curvature of the second covering material 41 is larger at the curved point than at the corner 36, a gap is formed between the curved point and the corner 36, and the heat insulating material 39 fitted to each cooling pipe 38 is located in the gap. As a result, in the corner 36, the battery-side power cable 26 and the cooling pipe 38 intersect each other (point of intersection), the second covering material 41 and the heat insulating material 39 fitted to the battery-side power cable 26 and the cooling pipe 38 respectively, are lightly in contact with or slightly separated from each other.

Although the cooling pipe 38 is hot, its heat is blocked by the heat insulating material 39 and the second covering material 41, and so heat damage to the battery-side power cable 26 is prevented. Due to vibration during vehicle running, the second covering material 41 and the heat insulating material 39 may rub each other, but direct contact between the battery-side power cable 26 and the cooling pipe 38 is prevented, and this prevents trouble such as damage to the battery-side power cable 26 from occurring.

In the state of intersection between the above-described battery-side power cable 26 and cooling pipe 38, the cooling pipe 38 is located on the front side (side wall 27*a* side of the front floor cross member 27) and the battery-side power cable 26 is located on the rear side (fuel tank 32 side). Thus, in the event of a side collision by another vehicle, which will be described later, the behavior of the battery-side power cable 26 following position displacement of the terminal block 34*a* of the driving battery 34 is possible without being blocked by the cooling pipe 38 fixed to the side wall 27*a* of the front floor cross member 27.

As shown in FIG. 4, the battery-side power cable 26 is further extended rightward over the extra length routing area 37 along the side wall 27*a* of the front floor cross member 27 from an end of the second covering material 41 (end of the corner 36). In this extra length routing area 37, the battery-side power cable 26 is routed with slack as the extra length area 26a and the third covering material 43 (third protector member) is fitted thereto, and a connector provided at an end of the extra length area 26a is connected to the connector of the terminal block 34a of the driving battery 34.

A routing state of the extra length area 26a of the battery-side power cable 26 will be described by assuming the terminal block 34a side as a starting point based on FIG. 4. First, the battery-side power cable 26 is pulled out upward from the terminal block 34a, extended upward along the side wall 27a of the front floor cross member 27 in the extra length routing area 37 of the side wall 27a, extended downward toward the side member 3l, and further continued to the side wall 3la of the side member 3l after passing through the area of the corner 36. In this way, the battery-side power cable 26 is extended in a mountainous way, and the extra length area 26a is formed to provide slack.

As described above, since the terminal block 34a is located below the front floor cross member 27 and the connector of the terminal block 34a is open upward, the extra length area 26a can be formed over the extra length routing area 37 of the side wall 27a without forcibly bending the battery-side power cable 26.

Figure 5:
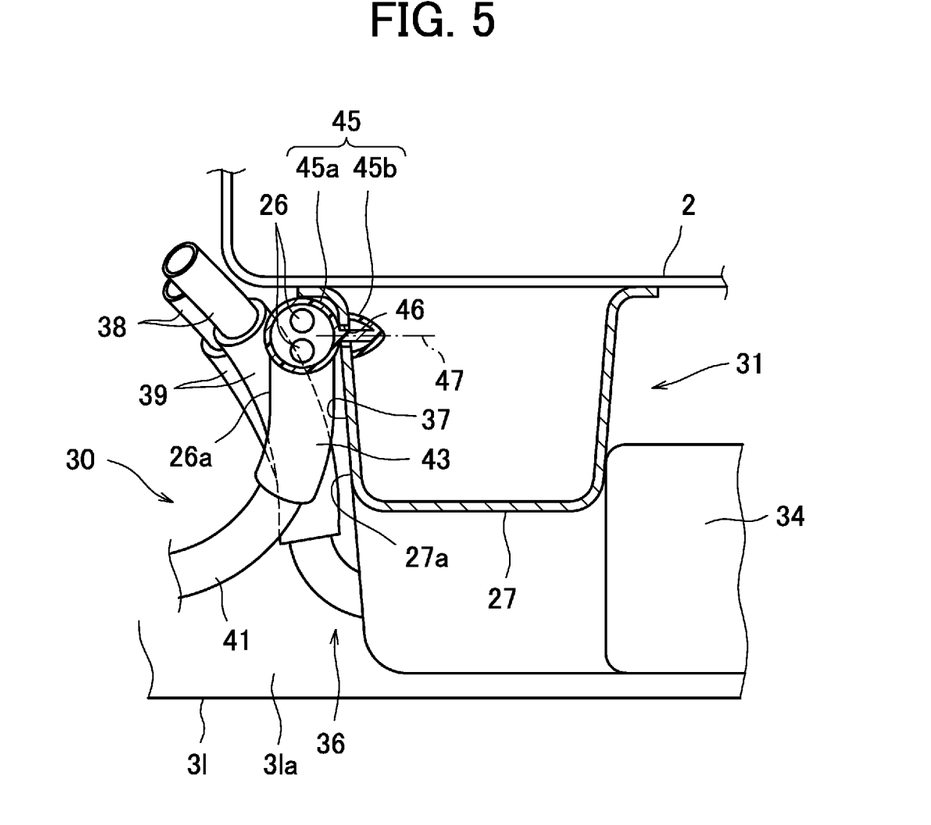
FIG. 5 is a V-V line cross-sectional view of FIG. 4 illustrating a state in which the battery-side power cable 26 is fixed by a clip.

FIG. 5 is a V-V line cross-sectional view of FIG. 4 illustrating a state in which the battery-side power cable 26 is fixed by a clip.

As shown in FIGS. 4 and 5, the region of the battery-side power cable 26 corresponding to a vertex of the extra length area 26a is fixed to the side wall 27a of the front floor cross member 27 by a clip 45.

The clip 45 is integrally molded with a synthetic resin material and constructed of a ring-shaped holding part 45a and a locking part 45b provided on one side of the holding part 45a. The third covering material 43 is externally fitted to the holding part 45a and the locking part 45b is elastically inserted/hooked into a clip hole 46 perforated in the side wall 27a of the front floor cross member 27. Thus, the extra length area 26a of the battery-side power cable 26 is fixed on the extra length routing area 37 of the side wall 27a via the clip 45 and the third covering material 43. Periodic shaking of the extra length area 26a due to vibration or the like during vehicle running may cause the battery-side power cable 26 to deteriorate, but fixing the clip 45 can prevent such a situation.

In order to externally fit the holding part 45a of the clip 45 to the third covering material 43, which has been fitted to the battery-side power cable 26, the holding part 45a together with the locking part 45b is divided into upper and lower parts, for example, using a dividing line 47 shown in FIG. 5 as a boundary. A procedure for fixing the battery-side power cable 26 in this case is separating the locking part 45b first and inserting the battery-side power cable 26 to which the third covering material 43 is fitted in advance from one side into the holding part 45a after passing through the locking part 45b. Next, when the locking part 45b is connected, the third covering material 43 is held in the holding part 45a with no gaps, and the locking part 45b is inserted into the clip hole 46 of the side wall 27a in this state. The locking part 45b expands by its own elasticity and is hooked in the clip hole 46, and this completes the fixing work.

Locking of the synthetic resin clip 45 by the locking part 45b is weaker than fastening by the metal bolts 42 that fix, for example, the second covering material 41. For this reason, although locking is maintained with the force normally received by the clip 45 such as vibration during vehicle running, locking is released when a larger predetermined load (more specifically, tension generated on the battery-side power cable 26 along with position displacement of the terminal block 34a, which will be described below) acts, and the clip 45 comes off the side wall 27a. As a result, in the event of a side collision by another vehicle, the behavior of the battery-side power cable 26 following position displacement of the terminal block 34a of the driving battery 34 is possible without being hindered by restraints of the clip 45.

On the other hand, the third covering material 43 has characteristics different from those of the first and second covering materials 41. That is, the third covering material 43 is made of a urethane member or the like and is provided with high impact absorption and flexibility. Therefore, unlike the first and second covering materials 41 that protects the battery-side power cable 26 with high strength in the event of a side collision by another vehicle, the third covering material 43 absorbs impact and thereby protects the battery-side power cable 26 inside. For example, in the event of a side collision by another vehicle, a damaged peripheral member may contact the battery-side power cable 26, but the third covering material 43 protects the battery-side power cable 26 from damage.

At the same time, since the third covering material 43 is highly flexible, in the event of a side collision by another vehicle, the behavior of the battery-side power cable 26 following position displacement of the terminal block 34a of the driving battery 34 is possible without being blocked by the third covering material 43.

Next, protective action in the event of a side collision by another vehicle, provided by the routing structure for the battery-side power cable 26 configured as described above will be described.

For example, when another vehicle collides from the left at a position in a front-rear direction that corresponds to the driving battery 34, the driving battery 34 is crushed in the left-right direction by impact, and the terminal block 34a is thereby displaced to the right as shown by two-dot dashed lines in FIG. 4. With position displacement, tension is generated in the battery-side power cable 26 and this tension acts as a downward force on the clip 45 that fixes the battery-side power cable 26. With rightward position displacement of the terminal block 34a, the tension of the battery-side power cable 26 increases, but locking by the locking part 45b of the clip 45 is released before damage such as wire breakage occurs in the battery-side power cable 26.

As a result, the battery-side power cable 26 will no longer be restrained by the clip 45 and the tension decreases rapidly. The terminal block 34a is further displaced to the right, but the semicircular extra length area 26a is stretched rightward, and the increase in the tension of the battery-side power cable 26 is suppressed, thus preventing damage such as wire breakage caused by tension.

Such tension restraining action is exerted by the extra length area 26a, which is action that can be surely obtained regardless of restrained states of other areas of the battery-side power cable 26.

That is, depending on a situation of side collision, the brackets 41a and 41b that fix the battery-side power cable 26 to the side wall 3la of the side member 3l may not be damaged or the fuel tank 32 may escape from impact and may hardly be deformed. As the prior art described in "Problems to be Solved by the Invention," if it is assumed that no extra length area 26a is provided for the battery-side power cable 26 of the present embodiment, in the former case, the brackets 41*a* and 41*b* keep the side member 3*l* fixed to the side wall 3*la*, and tension is generated in the battery-side power cable 26, whereas in the latter case, the behavior of the battery-side power cable 26 following the terminal block 34*a* is blocked by the fuel tank 32, which may generate tension and cause damage such as wire breakage in either case.

Since the extra length area 26*a* is provided in the present embodiment, tension generated in the battery-side power cable 26 can be suppressed in any side-collision situation without falling into such a situation. As a result, the battery-side power cable 26 can be reliably protected in the event of a side collision by another vehicle.

Although this completes the description of the embodiment, the aspects of the present invention are not limited to the above-described embodiment. According to the above-described embodiment, for example, the driving battery 34, the fuel tank 32 and the driving motor 9 are disposed in order from the front side of the vehicle body to drive the rear wheels 7, but the order may be reversed such that the driving battery 34, the fuel tank 32 and the driving motor 9 are disposed in order from the rear side of the vehicle body so as to drive the front wheels.

According to the above-described embodiment, although the driving battery 34 and the junction box 21 are connected via the battery-side power cable 26, the junction box 21 may be omitted and the driving battery 34 may be directly connected to the inverter 10 of the driving motor 9 via the battery-side power cable 26.

According to the above-described embodiment, although the semicircular extra length area 26*a* is formed, the shape of the extra length area 26*a* is not limited to the semicircular shape, but can be arbitrarily changed. For example, an upward convex semicircle and a downward convex semicircle may be combined to form a substantially S-shaped extra length area.

According to the above-described embodiment, although the third covering material 43 is fitted to the extra length area 26*a* of the battery-side power cable 26 and fixed to the side wall 27*a* of the front floor cross member 27 with the clip 45, these requirements are not necessarily essential, but either one or both may be omitted.

EXPLANATION OF REFERENCE SIGNS 1 hybrid vehicle
2 floor
3*l*, 3*r* side member
3*la* side wall
9 driving motor
26 battery-side power cable (power line)
26*a* extra length area
27 front floor cross member (cross member)
27*a* side wall
30 tank storage section
31 battery storage section
32 fuel tank
34 driving battery
34*a* terminal block
38 cooling pipe
39 heat insulating material (first protector member)
41 second covering material (second protector member)
42 bolt
43 third covering material (third protector member)
45 clip

The invention claimed is:

1. A hybrid vehicle comprising:
a fuel tank disposed in a tank storage section formed between left and right side members on a lower side of a floor of a vehicle body;
a driving battery disposed in a battery storage section aligned with the tank storage section in a front-rear direction across a cross member connecting between the left and right side members;
a driving motor disposed on an opposite side of the battery storage section in the front-rear direction of the vehicle with respect to the tank storage section; and
a power line that supplies power from the driving battery to the driving motor, wherein
part of the tank storage section includes the left and right side members and the cross members, and
the power line is extended along a side wall of either one of the left and right side members from a side wall of the cross member so as to bypass the fuel tank via either one of the left and right sides of the fuel tank from a terminal block of the driving battery and an extra length area with slack being formed in an area of the power line along the side wall of the cross member.

2. The hybrid vehicle according to claim 1, wherein the power line is extended in a mountainous way protruding upward along the side wall of the cross member to provide slack in the extra length area.

3. The hybrid vehicle according to claim 1, wherein the terminal block of the driving battery is disposed on a lower side of the cross member.

4. The hybrid vehicle according to claim 1, wherein
a battery-side connector on the driving battery side to which a power-line-side connector on the power line side is connected is formed on the fuel tank side on the terminal block of the driving battery, and
while the power-line-side connector is connected to the battery-side connector, the power-line-side connector protrudes from the cross member toward the fuel tank side and the power line is extended upward from a position at which the power-line-side connector protrudes toward the fuel tank side.

5. The hybrid vehicle according to claim 1, further comprising a cooling pipe that cools the driving motor by circulating cooling water in the driving motor, wherein
the cooling pipe is pulled into the tank storage section from the driving motor, extended along the side wall of the cross member so as to bypass the fuel tank via the other of the left and right sides of the fuel tank, and further extended passing through an intersection with the power line at a point of the side wall of the cross member, and
at the point of intersection, the cooling pipe is disposed on the cross member side and the power line is disposed on the fuel tank side.

6. The hybrid vehicle according to claim 5, wherein at the point of intersection, a first protector member is fitted to the cooling pipe and a second protector member is fitted to the power line.

7. The hybrid vehicle according to claim 6, wherein the second protector member is extended from the point of intersection to an area along either one of the left and right side members.

8. The hybrid vehicle according to claim 7, wherein
in the area along either one of the left and right side members, the second protector member is fixed to the floor panel of the vehicle body with a bolt, and in the extra length area, the power line is fixed to the side wall of the cross member with a clip that comes off due to a predetermined load.

9. The hybrid vehicle according to claim 1, wherein a third protector member with flexibility is fitted to the power line in the extra length area.

\* \* \* \* \*